(12) United States Patent
Takaragi et al.

(10) Patent No.: US 6,592,032 B1
(45) Date of Patent: Jul. 15, 2003

(54) CONTROL SYSTEM AND METHOD OF CONTROLLING INFORMATION WRITTEN INTO STORAGE MEDIA

(75) Inventors: Kazuo Takaragi, Ebina (JP); Chikashi Okamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/515,700

(22) Filed: Feb. 29, 2000

(30) Foreign Application Priority Data

Aug. 27, 1999 (JP) .......................................... 11-241906

(51) Int. Cl.[7] ................................................. G06K 5/00
(52) U.S. Cl. ......................................... 235/382; 235/375
(58) Field of Search ................................ 235/375, 380, 235/382; 455/550, 557, 558, 403–466, 575

(56) References Cited

U.S. PATENT DOCUMENTS

| 5,131,038 A | * | 7/1992 | Puhl et al. ................... 235/380 |
| 5,208,446 A | * | 5/1993 | Martinez ..................... 235/380 |
| 5,359,182 A | * | 10/1994 | Schilling ..................... 235/375 |
| 6,094,573 A | * | 7/2000 | Heinonen et al. ......... 379/88.25 |
| 6,122,355 A | * | 9/2000 | Strohl ....................... 379/114.1 |
| 6,169,890 B1 | * | 1/2001 | Vatanen ................. 379/357.01 |
| 6,311,055 B1 | * | 10/2001 | Boltz ........................... 379/196 |

FOREIGN PATENT DOCUMENTS

| JP | 3-38396 | 2/1991 |
| JP | 09288540 | 4/1997 |

* cited by examiner

Primary Examiner—Michael G. Lee
Assistant Examiner—Jamara A Franklin
(74) Attorney, Agent, or Firm—Townsend and Townsend and Crew LLP

(57) ABSTRACT

A method is adopted in a control apparatus for controlling ID information stored in a storage medium in conjunction with a terminal for reading the ID information from the storage medium and used to catalog information for the storage medium into a memory employed in the control apparatus. In an operation to catalog information into the memory of the control apparatus, the terminal receives the information, reads the ID information from the storage medium and transmits the information and the ID information to the control apparatus and the control apparatus catalogs the information and the ID information in the memory by associating the information with the ID information. In an operation to examine information already cataloged in the memory employed in the control apparatus, the terminal reads the ID information from the storage medium and transmits the ID information to the control apparatus; and the control apparatus transmits the information already cataloged in the memory and associated with the ID information to the terminal for displaying the information.

12 Claims, 13 Drawing Sheets

FIG.2
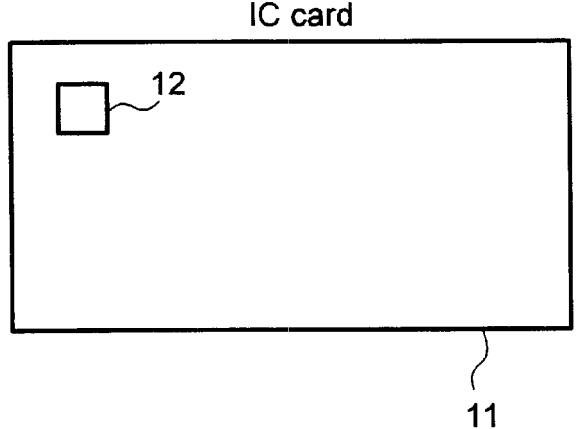
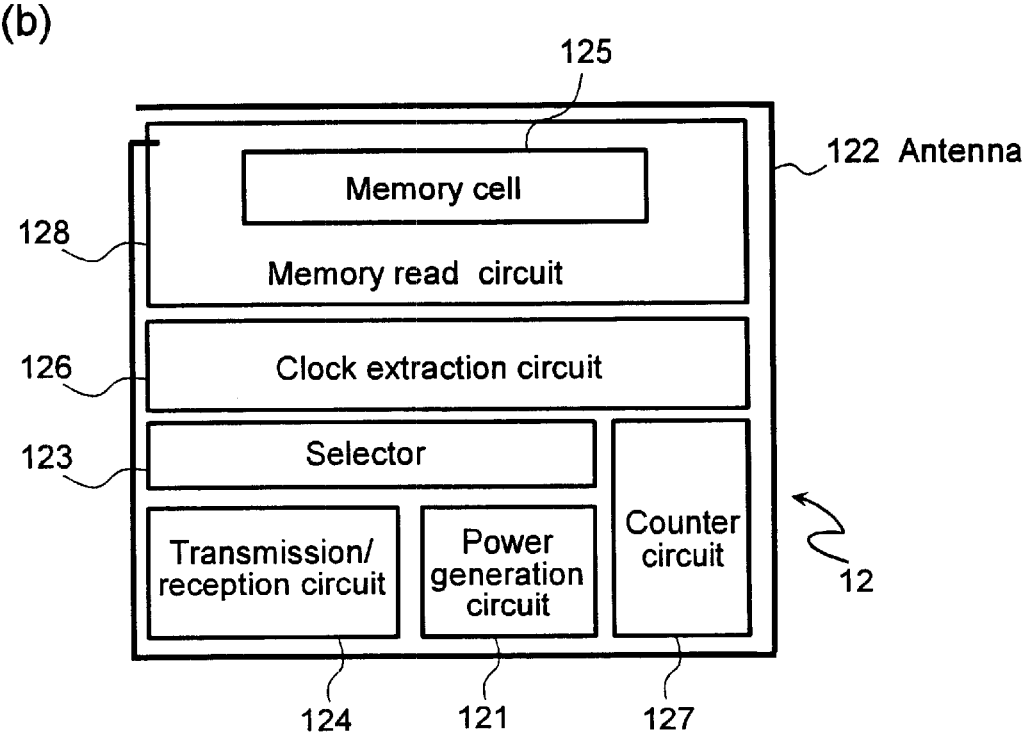

FIG. 3
(a)
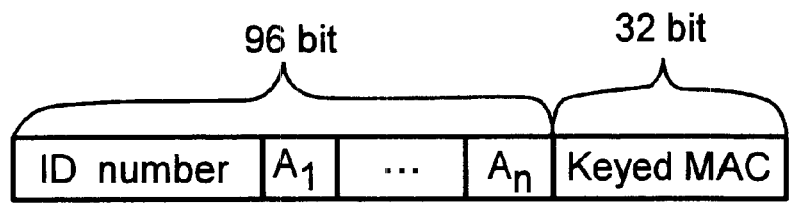
(b)
Class A 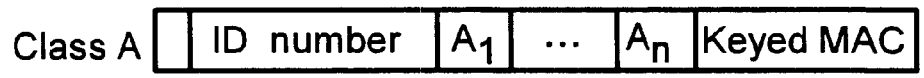
Class B 
Class Y 
Class Z 

Portable apparatus 20

| Attributes | | | ID number | Cataloged information |
|---|---|---|---|---|
| $A_1$ | ... | $A_n$ | | |
| ** | ... | ** | ******* | ***************** |
| ** | ... | ** | ******* | ***************** |
| ** | ... | ** | ******* | ***************** |
| ** | ... | ** | ******* | ***************** |
| ** | ... | ** | ******* | ***************** |

(b)

Class A

| Attributes | | | ID number | Cataloged information |
|---|---|---|---|---|
| $A_1$ | ... | $A_n$ | | |
| ** | ... | ** | ******* | ***************** |
| ** | ... | ** | ******* | ***************** |
| | | | | |

Class B

| Attributes | | | ID number | Cataloged information |
|---|---|---|---|---|
| $A_1$ | ... | $A_{n-1}$ | | |
| ** | ... | ** | ******* | ***************** |
| ** | ... | ** | ******* | ***************** |
| | | | | |

⋮

| Attributes | | | ID number | User ID number | Cataloged information |
|---|---|---|---|---|---|
| $A_1$ | ... | $A_n$ | | | |
| ** | ... | ** | ******** | ******* | ***************** |
| ** | ... | ** | ******** | ******* | ***************** |
| ** | ... | ** | ******** | | ***************** |
| ** | ... | ** | ******** | ******* | ***************** |
| ** | ... | ** | ******** | | ***************** |
| ⋮ | ⋮ | ⋮ | ⋮ | ⋮ | ⋮ |

CONTROL SYSTEM AND METHOD OF CONTROLLING INFORMATION WRITTEN INTO STORAGE MEDIA

BACKGROUND OF THE INVENTION

This invention relates to a system using storage media such as an IC card having an electronic circuit chip mounted therein or a magnetic recording card.

With the progress in miniaturization and thickness reduction of integrated circuit chips, a variety of new uses for such have been proposed. In Japanese Patent Laid-open No. Hei 3-38396, a technique is described for utilizing an electronic circuit chip for storing information by mounting the chip on a card along with an antenna device to allow information to be read from the chip by a non-contact reading technique. By storing information about the owner of such a card in a chip mounted on the card, the card can be used as an ID card. In addition, by storing information about an item to which such a card is attached, the card can be used as a tag of the commodity.

The amount of information that can be stored in an electronic circuit chip mounted on a card depends on the size of the card. The larger the amount of information required to be stored in the chip, the larger the size of the card. Because a large card is less portable, if portability is of importance, it is necessary to reduce the size of the card. A small card, however, allows only a small chip with a small amount of information. These relationships apply not only to a card using an electronic circuit chip, but also other storage media such as a magnetic recording card.

To allow information to be stored on a card having an electronic circuit chip, a RAM (Random Access Memory) or other writable memory must be included in the electronic circuit chip. In general, RAM is large and expensive in comparison with a ROM (Read-Only Memory). Thus, a card having an electronic circuit chip including RAM is less portable, and more expensive.

SUMMARY OF THE INVENTION

This invention provides a storage medium, such as a card with an electronic circuit chip mounted thereon or a magnetic recording card, which appears to a system as if the storage medium were a medium allowing information exceeding the storage capacity of the storage medium to be stored. It also provides a read-only storage medium.

The invention also provides a method of controlling information to be written into a storage medium used for storing ID information, a control apparatus for controlling the ID information stored in the storage medium and a terminal for reading the information from the storage medium and displaying it. In an operation to catalog information for the storage medium into the control apparatus, the ID information from the storage medium is read and transmitted to control apparatus which then catalogs the ID information and the information to be cataloged in the control apparatus. In an operation to examine information already cataloged in the control apparatus for the storage medium, the terminal reads the ID information from the storage medium and transmits it to the control apparatus to acquire the information already cataloged in the control apparatus. The control apparatus transmits the information already cataloged for the storage medium associated with the ID information to the terminal.

The storage medium typically comprises an integrated circuit chip in which ID information is stored in advance and an antenna for generating power by utilizing a received electromagnetic waves. The antenna allows information to be read from the electronic circuit chip and can also be used for transmitting the information. The electronic circuit chip and the antenna are mounted on a sheet, typically formed from paper or plastic. The terminal generates electromagnetic waves to read ID information from the storage medium without contacting the medium. Preferably, the information is encrypted, and the ID information read from the storage medium is transmitted to the control apparatus by using electromagnetic waves or a public network.

To store information, the terminal reads ID information from the storage medium, then transmits the ID information to the control apparatus with the information to be stored. The control apparatus catalogs the information received from the terminal into a memory in the control apparatus for the storage medium by associating the information with the ID information.

Because information to be cataloged for the storage medium is stored in a memory in the control apparatus and associated with ID information, the information to be cataloged for the storage medium can be handled as if it were possible to store the information into the storage medium, even if the amount of the information is greater than the storage capacity of the storage medium, or even if the storage medium is a read-only medium.

In addition to ID information, the storage medium can also be used for storing authentication information for the ID information. That information can be authenticated by the control apparatus with use of a key stored therein, in advance. Thus, it is possible to check whether ID information stored in the storage medium has been altered by using the authentication information stored in the storage medium along with the ID information. As a result, information security is improved.

If attribute information is stored in the storage medium in advance with ID information, the control apparatus can also be used for controlling ID information and information stored in the storage medium by associating them with the attribute information.

The terminal can be used for locally controlling some pieces of ID information and some pieces of cataloged information which are controlled by the control apparatus and associated with at least a piece of attribute information. For the terminal to examine information cataloged in the control apparatus, the terminal reads ID information and attribute information associated with the cataloged information from the storage medium, then checks whether the ID information is one of the pieces of ID information controlled by the terminal itself.

If the ID information associated with the attribute information is one of the pieces of ID information controlled by the terminal itself, the terminal immediately searches the pieces of ID information it controls for the ID information, and thus is capable of carrying out processing using a particular piece of cataloged information associated with the ID information. Thus, because it is no longer necessary to access the control apparatus, the operation to search the cataloged information can be performed locally in the terminal using high-speed processing. If the ID information associated with the attribute information is not one of the pieces of ID information controlled by the terminal itself, a piece of cataloged information and a piece of ID information associated with the attribute information are acquired from the control apparatus. Then, after the pieces of cataloged information and the pieces of ID information controlled by the terminal have been updated by using the piece of cataloged information and the piece of ID information acquired from the control apparatus, the terminal searches the pieces of ID information controlled by itself for the ID information read from the storage medium and processes it using cataloged information associated with the ID information found in the search.

The control apparatus can also be used for controlling ID information of the storage medium by associating the ID information with user ID information set by the user of the storage medium. In this case, to examine information cataloged in the control apparatus for the storage medium, the terminal reads ID information of the storage medium and transmits the ID information to the control apparatus. The control apparatus transmits cataloged information associated with the ID information received from the terminal and the user ID information. Because the user of the storage medium is allowed to provide user ID information serving as control information unique to the user itself to the storage medium, the user is capable of controlling the storage medium.

BRIEF DESCRIPTION OF THE DRAWINGS

The invention will be more apparent from the following detailed description when taken in conjunction with the accompanying drawings, in which:

FIGS. 2a and 2b are diagrams showing a configuration of an IC card;

FIGS. 3a and 3b are explanatory diagrams showing information stored in a memory of an electronic circuit chip;

FIGS. 7a and 7b are explanatory diagrams showing data stored in an ID database 31 of the control apparatus 30;

DESCRIPTION OF THE SPECIFIC EMBODIMENTS

Figure 1:
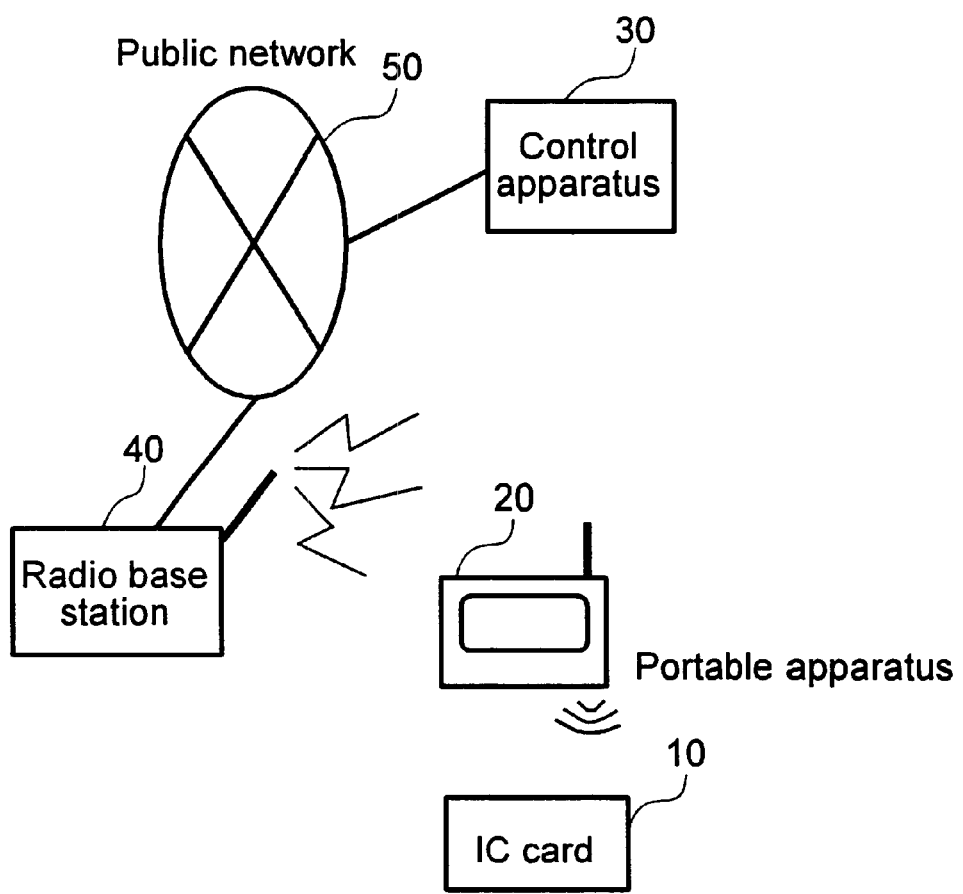
FIG. 1 is a diagram showing the configuration of a control system implemented by a first embodiment of the present invention in a plain and simple manner.

Preferred embodiments of the present invention are described below. FIG. 1 is a diagram showing the configuration of a control system implemented in a first embodiment of the present invention. As shown, a control apparatus 30 and a portable apparatus 20 are connected to each other by a radio base station 40 and a public network 50 of a mobile communication system for mobile telephones and other radio devices.

Control apparatus 30 controls information stored therein for an IC card 10 by associating the information with an ID number stored in the IC card 10. The portable apparatus 20 reads information stored in the IC card 10 with a non-contact technique and the mobile communication device. The mobile telephone 20 is thus capable of reading information stored in the IC card 10 and transmitting the information to the control apparatus 30, as well as carrying out processing using cataloged information received from the control apparatus 30.

FIGS. 2a and 2b are diagrams showing a configuration of the IC card 10. As shown in FIG. 2a, the IC card 10 includes an integrated circuit 12 mounted on a sheet 11 of paper, plastic, or other well known material. The circuit may also be sandwiched between two sheets 11. In either case, the chip 12 stores and reads information and generates power by using received electromagnetic energy.

FIG. 2b is a block diagram showing components of chip 12. A power generation circuit 121 utilizes electromagnetic waves received from an antenna 122 to generate power and supply it to other components on the chip 12. A selector 123 changes the transmission/reception state of a transmission/reception circuit 124. Normally, the transmission/reception circuit 124 is set in a reception state, but when information is read from memory 125, the transmission/reception circuit 124 is switched to a transmission state. A clock extraction circuit 126 and a counter circuit 127 generate a clock signal for reading information from a memory 125 powered by electromagnetic waves received through the antenna 122 and the transmission/reception circuit 124. A memory read circuit 128 reads information from the memory 125 using the clock signal from clock extraction circuit 126. The information is transmitted through the transmission/reception circuit 124 and the antenna 122.

Chip 12 is typically a small chip with the memory 125 having a square area of about 0.3 mm×0.3 mm and a thickness of 10 $\mu$m or smaller (in 1999). The memory read circuit 128 is implemented by a ROM with a storage capacity of 128 bits.

FIGS. 3a and 3b are diagrams showing information stored in the memory 125 of chip 12. As shown in FIG. 3a, memory 125 is used by the user of chip 12 to store an ID number, having at least one of a set of attribute numbers A1 to An where $1 \leq n$ and a keyed MAC (Message Authentication Code) previously stored.

Used for identifying the electronic circuit chip 12, the ID number is a unique number assigned to each one of the electronic circuit chip 12. The set of attribute numbers A1 to An classify IC card 10 on which chip 12 is mounted. The set of attribute numbers A1 to An are unique numbers assigned to identify attributes of the IC card 10, such as the utilization, characteristics, and the purchaser of the IC card 10. Examples of the utilization of the IC card 10 are a certificate as an identification of an individual, or as a tag for an item for a purchaser.

The keyed MAC is a code obtained as a result of coding the ID number and the set of attribute numbers A1 to An or their hash values by using a private key owned by the provider of the electronic circuit chip 12. This code is used for detecting alteration of the ID number and the set of attribute numbers A1 to An stored in the memory 125.

In the example shown in FIG. 3a, the ID number and the set of attribute numbers A1 to An occupy 96 bits of the 128 bits of the information. The remaining 32 bits are allocated to the keyed MAC. In this way, a 96-bit number unique to each chip 12 can be assigned to chip 12. There are $2^{96}$ unique numbers that can be formed with 96 bits and these unique numbers are plentiful enough to be assigned to different chips 12.

Figure 4:
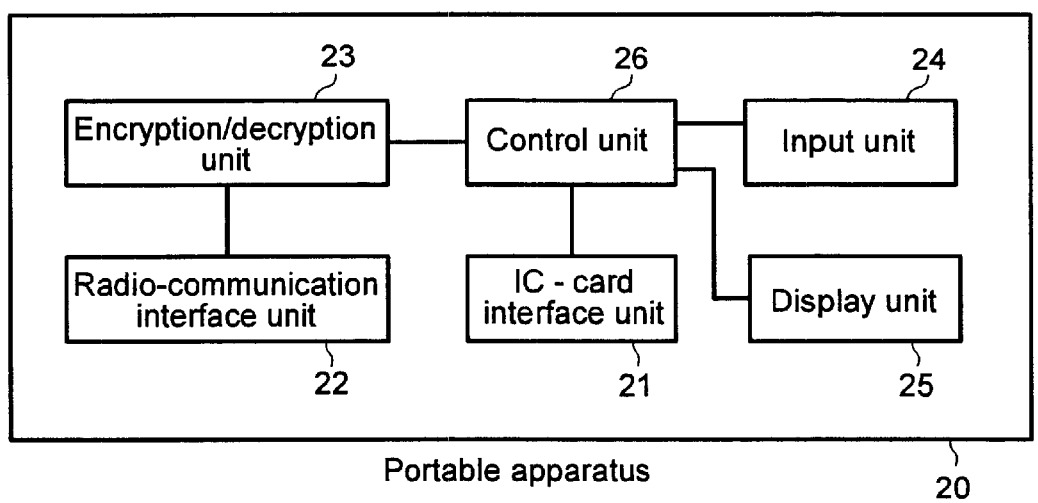
FIG. 4 is a block diagram showing the functional configuration of a portable apparatus 20.

FIG. 4 is a block diagram showing the functional configuration of the portable apparatus 20. As shown, the portable apparatus 20 comprises an IC-card interface unit 21, a radio-communication interface unit 22, an encryption/decryption unit 23, an input unit 24, a display unit 25 and a control unit 26. The IC-card interface unit 21 generates electromagnetic waves for driving the IC card 10 to generate power, and receives information transmitted by the IC card 10. In this way, information can be read from the IC card 10 without physical contact to it. Radio-communication interface 22 allows the portable apparatus 20 to function as a mobile telephone or equivalent to communicate with control apparatus 30 through a radio base station 40 and a network 50.

The encryption/decryption unit 23 encrypts information to be transmitted to the control apparatus 30 by using a common key kept secret between the portable apparatus 20 and the control apparatus 30, or by using a public key forming a pair in conjunction with a private key kept confidential by the control apparatus 30. In addition, the encryption/decryption unit 23 decrypts encrypted information received from the control apparatus 30 by using the common key kept secret between the portable apparatus 20 and the control apparatus 30, or by using a private key kept confidential by the portable apparatus 20 itself. In this way, encrypted communications can be exchanged between the portable apparatus 20 and the control apparatus 30.

Input unit 24 receives a command to catalog information into the control apparatus 30 for the IC card 10 or a display command entered by the user. The input unit 24 also receives information to be written into the IC card 10. The display unit 25 displays information received by the input unit 24 to be cataloged for the IC card 10 or encrypted information received from the control apparatus 30 and decrypted by the encryption/decryption unit 23. The control unit 26 controls the other components of the portable apparatus 20 to display information to be cataloged for the IC card 10 on the display unit 25 and to transmit the information to be cataloged into the ID database 32 of the control apparatus 30.

Figure 5:
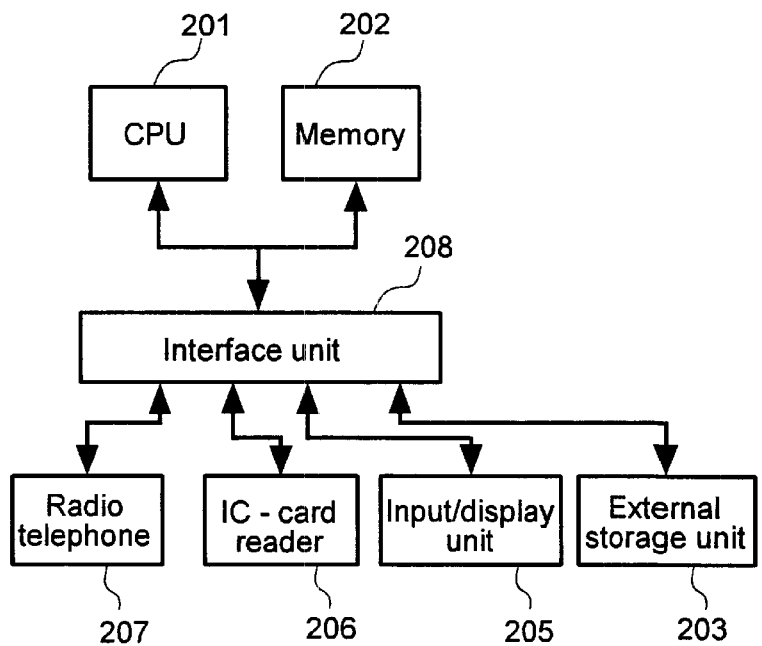
FIG. 5 is a block diagram showing a typical hardware configuration of the portable apparatus 20.

FIG. 5 is a diagram showing a typical hardware configuration for the portable apparatus 20. Apparatus 20 includes a CPU (Central Processing Unit) 201, a memory 202, an external storage unit 203, an input/display unit 205, an IC-card reader 206, a radio telephone 207 and an interface unit 208. The external storage unit 203 has a hard disc and a portable storage medium such as a CD-ROM (Compact Disc-Read Only Memory) or an FD (Floppy Disc). The input/display unit 205 is preferably a touch sensitive liquid-crystal display. The IC-card reader 206 reads information from IC card 10. Radio telephone 207 allows apparatus 20 to function as a mobile telephone or similar device. Interface unit 208 provides an interface among the CPU 201 the memory 202, the external storage unit 203, the input/display unit 205, the IC-card reader 206 and the radio telephone 207. Apparatus 20 thus can be implemented on a portable computer or a PDA (Personal Digital Assistant).

The functional configuration of apparatus 20 in FIG. 4 compares with the hardware configuration in FIG. 5 as follows. The IC-card interface unit 21 corresponds to an IC-card reader 206. The radio-communication interface unit 22 corresponds to the radio telephone 207, while the input unit 24 and the display unit 25 correspond to the input/display unit 205. The IC-card reader 206 and the radio telephone 207 are not necessarily integrated with the portable apparatus 20. Instead, they can be provided externally. The encryption/decryption unit 23 and the control unit 26 are each processes carried out in a computer. They are implemented by executing a program loaded into the memory 202 in the CPU 201. Such a program is normally stored in an external storage unit 203, including a hard disc or a portable storage medium in advance, and read from the external storage unit 203, then loaded to the memory 202 when needed by the CPU 201. An alternative, such a program, can be downloaded into the external storage unit 203, including a hard disc or a floppy disc (FD) through telephone 207 before being loaded into the memory 202. As another alternative, such a program can be loaded into the memory 202 directly and executed by CPU 201.

Figure 6:
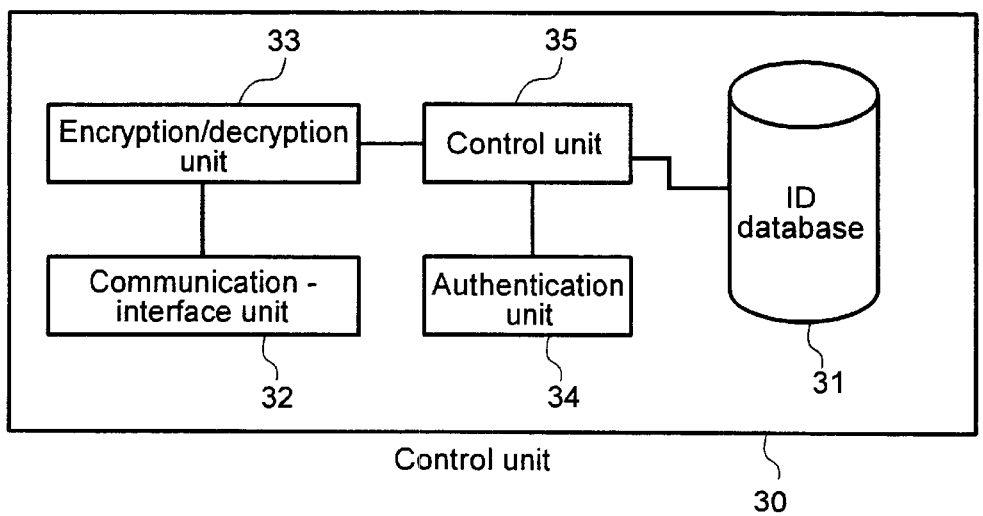
FIG. 6 is a block diagram showing the functional configuration of a control apparatus 30.

FIG. 6 is a block diagram showing the configuration of control apparatus 30. Control apparatus 30 includes an ID database 31, a communication interface unit 32, an encryption/decryption unit 33, an authentication unit 34 and a control unit 35.

FIGS. 7a and 7b are diagrams showing data stored in the ID database 31. In FIG. 7a, an ID number assigned by the provider of the chip 12 is cataloged in the ID database 31, being associated with a set of attribute numbers which are assigned to chip 12, along with the ID number. Each row used for storing an ID number includes a region for storing information cataloged for chip 12. The information is updated if necessary. Communication interface unit 32 communicates with the portable apparatus 20 through the public network 50 and the radio base station 40.

The encryption/decryption unit 33 encrypts information to be transmitted to the portable apparatus 20 by using a common key kept secret between the portable apparatus 20 and the control apparatus 30, or by using a public key forming a pair in conjunction with a private key kept confidential by the portable apparatus 20. In addition, the encryption/decryption unit 33 decrypts encrypted information received from the portable apparatus 20 in the same way. Thus, encrypted communications are exchanged between portable apparatus 20 and control apparatus 30.

The authentication unit 34 performs decryption. MAC received from the portable apparatus 20 by using a public key forming a pair in conjunction with a private key used by the provider of chip 12 and compares a result of the decryption with an ID number and a set of attribute numbers received to authenticate the ID number and the set of attribute numbers.

Figure 8:
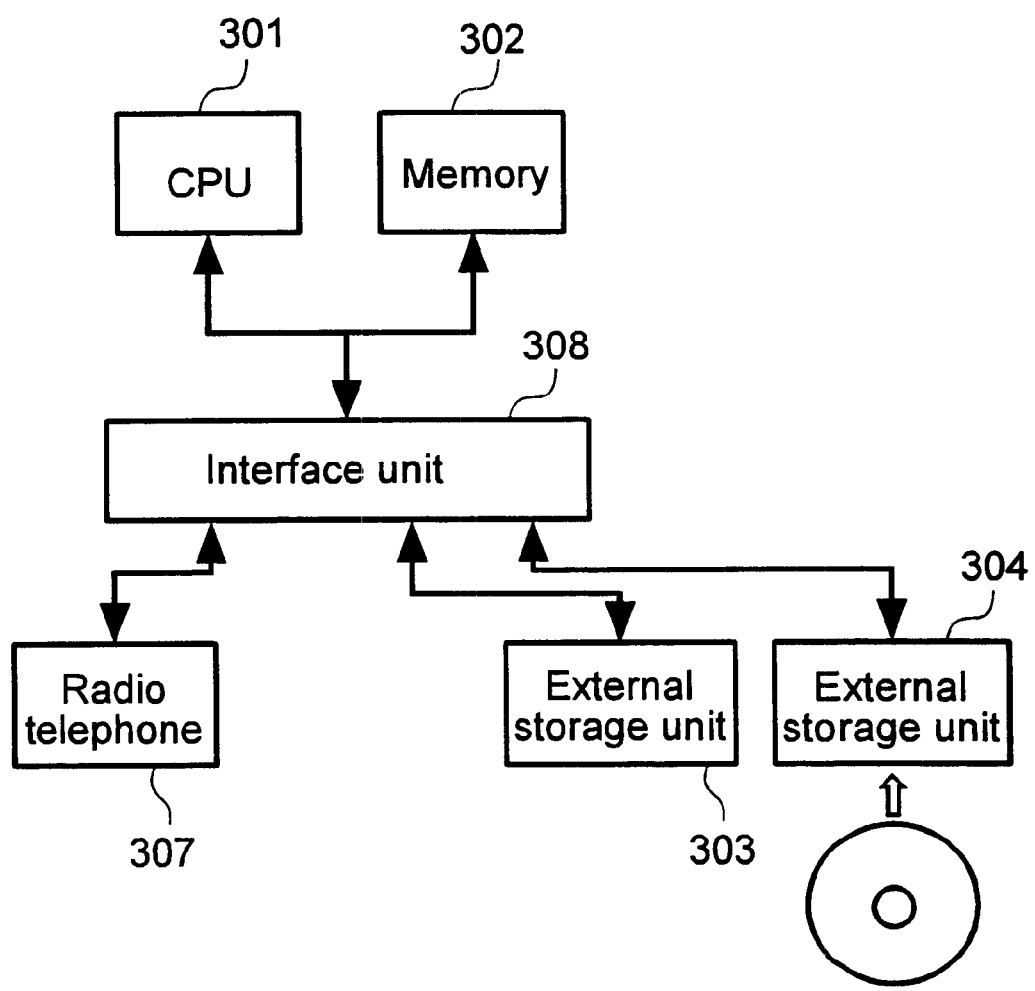
FIG. 8 is a block diagram showing a typical hardware configuration of the control apparatus 30.

The control unit 35 controls apparatus 30 to catalog information into the ID database 31 and read cataloged information from the ID database 31. FIG. 8 is a block diagram showing a typical hardware configuration for the control apparatus 30. As shown, control apparatus 30 includes a CPU 301, a memory 302, an external storage unit 303 such as a hard disc drive, an external storage unit 304 for reading information from a portable storage medium such as a CD-ROM or an FD, a communication unit 307 for connecting the control apparatus 30 with the public network 50 and an interface unit 308 serving as an interface among the CPU 301, the memory 302, the external storage unit 303, the external storage unit 304 and the communication unit 307. The control apparatus 30 can thus be implemented on a portable computer, for example, a conventional personal computer.

The functional configuration of control apparatus 30 in FIG. 6 compares with the hardware configuration in FIG. 8 as follows. The ID database 31 corresponds to the external storage unit 303, while the communication interface unit 32 corresponds to the communication unit 307. The encryption/decryption unit 33, the authentication unit 34 and the control unit 35 are each processes carried out in an electronic computer. Each is implemented by executing a program loaded into memory 302 in the CPU 301. Such a program is normally stored in the external storage unit 303 (a hard disc or a portable storage medium) in advance, and read from the external storage unit 303 and loaded into the memory 302 when needed for execution by the CPU 301. Alternatively, such a program can be read by the external storage unit 304 from a portable storage medium such as a CD-ROM or an ED and installed in the external storage unit 303 to be loaded into memory 302 when needed for execution. As other alternatives, such a program can be loaded into the memory 302 directly from a portable storage medium; or downloaded into a program storage medium, such as a FD, before being loaded into the memory 302, or downloaded to the memory 302 directly for execution by the CPU 301.

Figure 9:
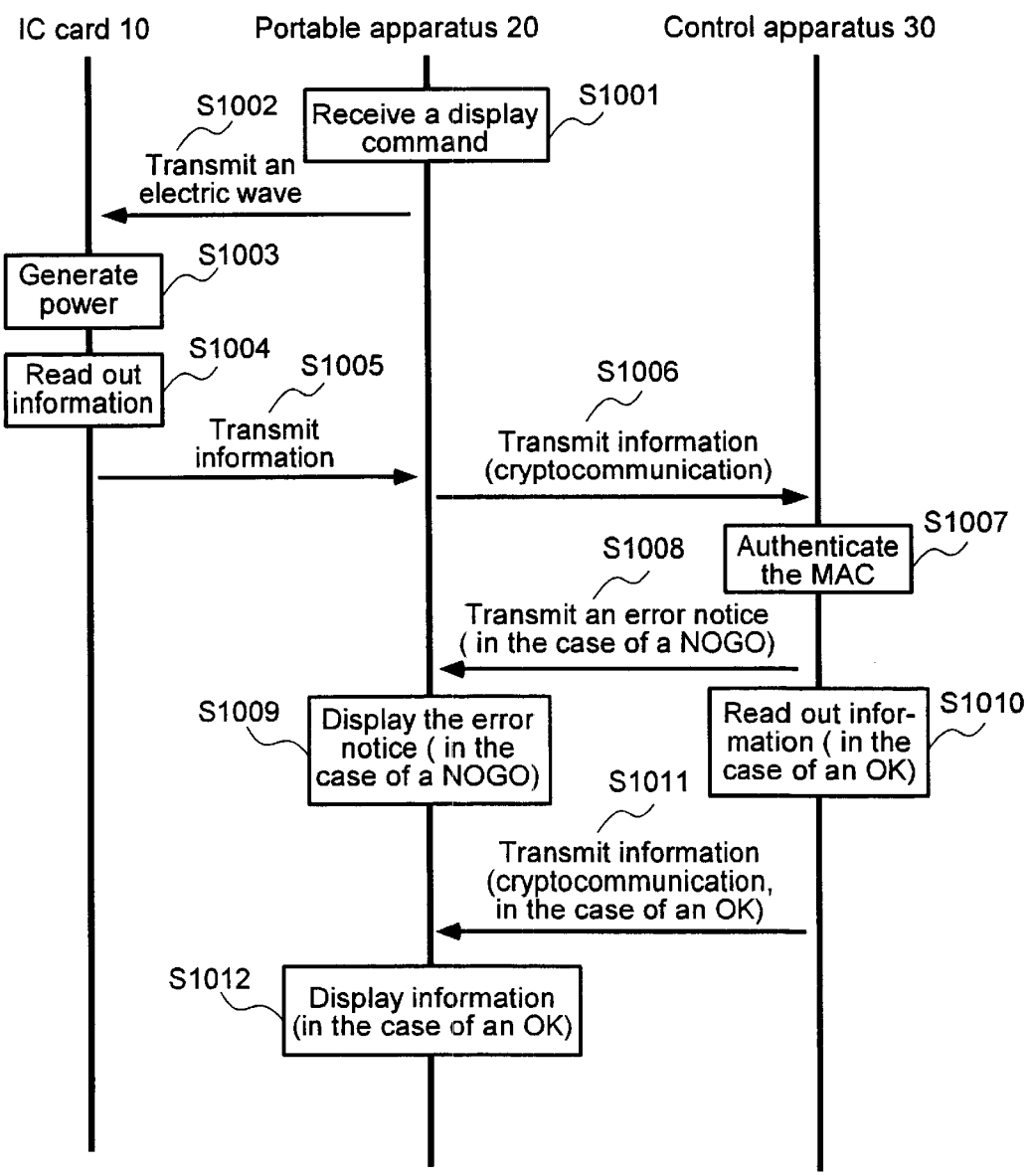
FIG. 9 is a diagram showing a sequence of operations performed by the control system to examine information cataloged in the ID database 31 of the control apparatus 30 for the information on the IC card 10.

The operation of the control system is as follows. FIG. 9 illustrates a sequence of operations performed by the control system to examine information cataloged in the ID database, when initiated by a command entered by the user of the portable apparatus 20. Processing using the cataloged information is exemplified by display of the information. The operations are explained by referring to FIG. 9.

The sequence of operations begins when the user of the portable apparatus 20 places the apparatus in proximity to the IC card 10 and enters a command to the input unit 24 to display cataloged information for the IC card 10. As shown, the sequence of operations starts with step S1001, at which the control unit 26 receives the command to display cataloged information for the IC card 10 activating the interface unit 21. At step S1002, the interface unit 21 generates electromagnetic waves applied to IC card 10.

At step S1003, the antenna 122 of the electronic circuit chip 12 receives the electromagnetic waves which drive the power generation circuit 121 to generate power, activating the other components employed in the electronic circuit chip 12. At step S1004, the memory read circuit 128 reads an ID number, a set of attribute numbers and a keyed MAC stored by the provider of the electronic circuit chip 12 from the memory 125 in accordance with a clock signal generated by the counter circuit 127 and the clock extraction circuit 126. At step S1005, the selector 123 and the transmission/reception circuit 124 transmit the ID number, the set of attribute numbers and the keyed MAC to the portable apparatus 20 using antenna 122.

At step S1006, the control unit 26 receives the ID number, the set of attribute numbers and the keyed MAC from the IC card 10 through the IC-card interface unit 21, passing them on to the encryption/decryption unit 23 which encrypts and transmits them to the control apparatus 30. The encryption/decryption unit 33 receives the encrypted ID number, the set of encrypted attribute numbers and the encrypted keyed MAC through the communication interface unit 32. The encryption/decryption unit 33 passes on information obtained as a result of the decryption to the control unit 35, which then forwards the information to the authentication unit 34 for authentication.

The authentication unit 34 checks whether the information has been altered. In particular, the authentication unit 34 decrypts the keyed MAC received from the portable apparatus 20 by using a public key forming a pair in conjunction with a private key kept confidential by the provider of chip 12 and compares a result of the decryption with the ID number and the set of attribute numbers (or their hash values) received along with the keyed MAC. This authenticates the ID number and the set of attribute numbers. A match indicates that the keyed MAC is proven to be a result of encryption of the ID number and the set of attribute numbers (or their hash values) received from the portable apparatus 20 by using a private key known only by the provider of the electronic circuit chip 12. Thus, if they match, the ID number and the set of attribute numbers are determined to have not been altered. On the other hand, if they do not match each other, the ID number and/or the set of attribute numbers are determined to have been altered.

If the result of the authentication is a NG indicating that the ID number and/or the set of attribute numbers have been altered, the sequence of operations goes to step S1008 where the control unit 35 transmits an error notice to the portable apparatus 20 using the encryption/decryption unit 33 and the communication interface unit 32. At step S1009, the control unit 26 employed in the portable apparatus 20 receives the information from the control apparatus 30 and the encryption/decryption unit 23, recognizing that the information is the error notice. In this case, the control unit 26 displays the error notice on the display unit 25.

If the result of the authentication is an OK indicating that the ID number and the set of attribute numbers have not been altered, the sequence of operations proceeds to step S1010 at which the control unit 35 reads cataloged information associated with the ID number from the ID database 31. Control unit 35 searches the ID database 31 for ID numbers matching (or classified in) the set of attribute numbers received from the encryption/decryption unit 33. The control unit 35 further searches the ID numbers found in the search process mentioned above from the ID number received from the encryption/decryption unit 33. Subsequently, the control unit 35 reads cataloged information from a row in the ID database 31 indicated by the ID number matching with the ID number received from the encryption/decryption unit 33, supplying the information to the encryption/decryption unit 33 which then encrypts the information by using a common key kept secret between the portable apparatus 20 and the control apparatus 30, or by using a public key forming a pair in conjunction with a private key kept confidential by the portable apparatus 20. At step S1011, the encrypted information is transmitted to the portable apparatus 20 using the communication interface unit 32.

At step S1012, the encryption/decryption unit 23 receives the encrypted information from the control apparatus 30 through the communication interface unit 22 and decrypts the encrypted information by using the common key or a private key owned by the portable apparatus 20, supplying a result of the decryption to the control unit 26 which then displays the decrypted information on the display unit 25.

Figure 10:
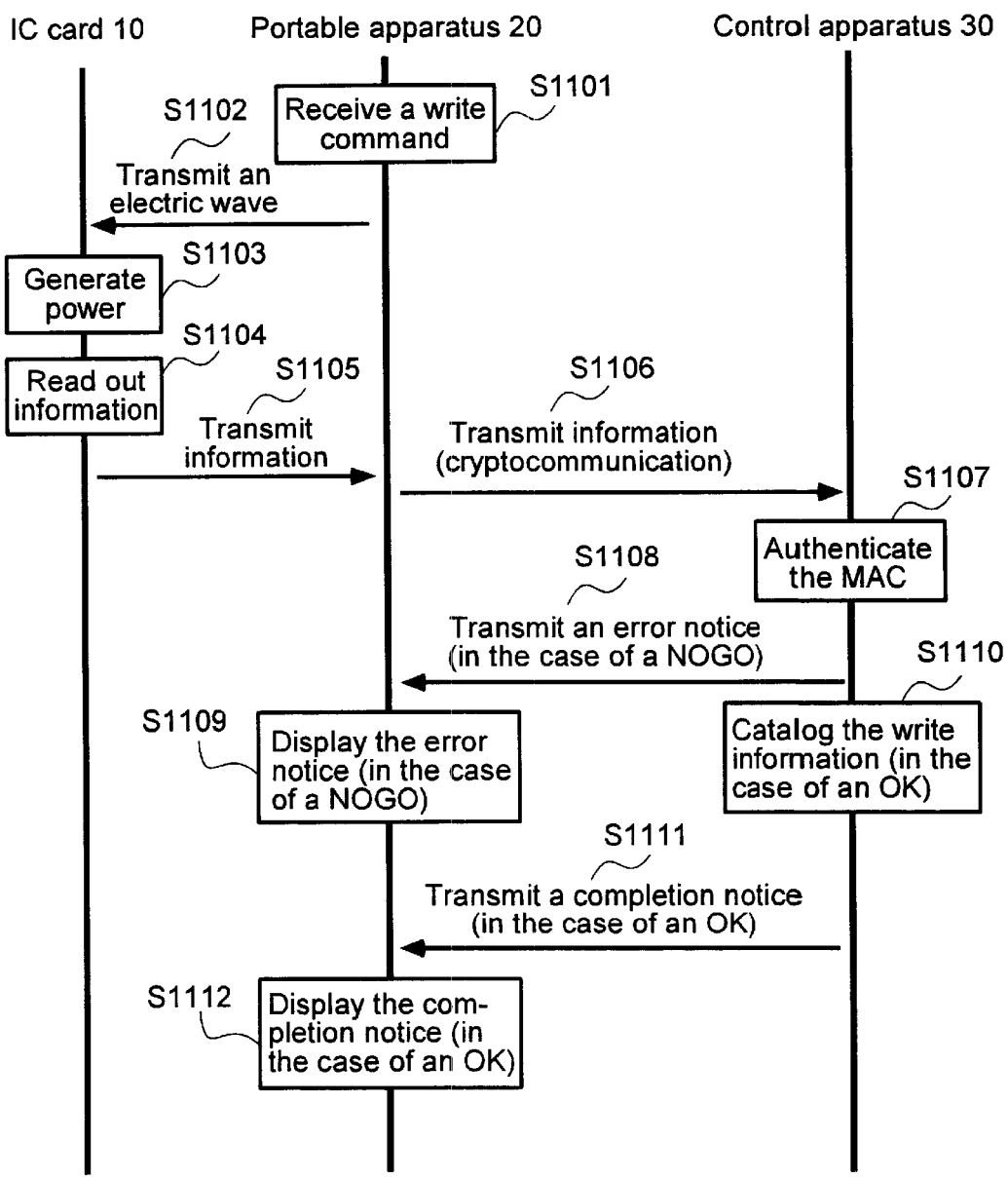
FIG. 10 is a diagram showing a sequence of operations performed by the control system to catalog new information in the ID database 31 for the information on IC card 10.

FIG. 10 is a diagram showing a sequence of operations for the control system implemented to catalog information to be recorded in the ID database 31 of the control apparatus 30 for the IC card 10, as initiated by a command entered by the user of the portable apparatus 20. The operations are explained by referring to FIG. 10. The sequence of operations starts when the user of apparatus 20 moves it to a position in proximity to the IC card 10 and enters a command to catalog information for the IC card 10 into the ID database 31.

As shown in FIG. 10, the sequence of operations starts with step S1101 at which the control unit 26 receives the command to catalog information for the IC card 10 into the database, and the information to be cataloged as entered by the user, activating the IC card interface unit 21. At step S1102, the IC card interface unit 21 generates an electromagnetic waves and supplies IC card 10.

At step S1103, the antenna 122 of chip 12 mounted on the IC card 10 receives the electromagnetic waves to power circuit 121 to generate power for activating other components on chip 12. At step S1104, the memory read circuit 128 reads the ID number, a set of attribute numbers and a keyed MAC from memory 125 in accordance with a clock signal generated by the counter circuit 127 and the clock extraction circuit 126. At step S1105, the selector 123 and the transmission/reception circuit 124 transmit the ID number, the set of attribute numbers and the keyed MAC to the portable apparatus 20 using the antenna 122.

At step S106, the control unit 26 receives the ID number, the set of attribute numbers and the keyed MAC from the IC card 10 through interface unit 21. It passes them along to the encryption/decryption unit 23 with the information entered into the input unit 24 to be cataloged into the ID database 31. This unit encrypts and transmits them to the control apparatus 30 using radio-communication interface unit 22.

The encryption/decryption unit 33 receives the encrypted ID number, the set of encrypted attribute numbers, the encrypted keyed MAC and the encrypted information to be cataloged in the ID database 31 through the communication interface unit 32, decrypting the encrypted information. The encryption/decryption unit 33 supplies information from the decryption to the control unit 35, which then forwards the information to the authentication unit 34. Authentication unit 34 checks whether the ID number and/or the set of attribute numbers have been altered by using the keyed MAC in the same way as step S1007 of FIG. 9.

If the result of the authentication is a NG indicating that the ID number and/or the set of attribute numbers have been altered, the sequence of operations goes to step S1108. The control unit 35 transmits an error notice to the portable apparatus 20 by the encryption/decryption unit 33 and the communication interface unit 32. At step S1109, the control unit 26 receives the information from the control apparatus 30 through the radio-communication interface unit 22 and the encryption/decryption unit 23, recognizing the error notice. The control unit 26 displays the error notice on the display unit 25. The portable apparatus 20 can also be notified of the altered (NG) state using other means.

If the result of the authentication is an OK indicating that the ID number and the set of attribute numbers have not been altered, the sequence of operations goes to step S1110 at which the control unit 35 employed in the control apparatus 30 catalogs the information received from the portable apparatus 20 into a row of the ID database 31 having the corresponding ID number and the set of attribute numbers received from the portable apparatus 20. The control unit 35 first searches the ID database 31 for ID numbers associated with (or classified in) the set of attribute numbers received from the encryption/decryption unit 33. The control unit 35 then searches the ID numbers found in the search operation received from the encryption/decryption unit 33 from the ID number cataloged. Subsequently, the control unit 35 catalogs the information into a row in the ID database 31 having the ID number matching with the ID number received from the encryption/decryption unit 33, or updates existing information on the row, if any. At step S1111, the control unit 35 notifies the portable apparatus 20 that the operation to catalog the information onto the ID database 31 has been completed through the encryption/decryption unit 33 and communication interface unit 32. At step S1112, the control unit 26 employed in the portable apparatus 20 receives the notice of the completion from the control apparatus 30, displaying that notice on the display unit 25.

As described, to catalog information into the ID database of the control apparatus 30 in this embodiment, the portable apparatus 20 reads an ID number from the IC card 10, transmitting the ID number and the information to be cataloged to the control apparatus 30 which then catalogs them into the ID database 31 by associating the information to be cataloged with the ID number. To examine information cataloged in the ID database 31, the portable apparatus 20 reads an ID number from the IC card 10, transmitting the ID number to the control apparatus 30 which then reads cataloged information associated with the corresponding ID number from the ID database 31 and transmits the cataloged information to the portable apparatus 20. The portable apparatus 20 receives the cataloged information and carries out processing, for example, to display the information to the user.

Because information in the ID database 31 is cataloged and controlled in the control apparatus 30 by being associated with ID information of the IC card 10, the cataloged information appears to the user as if the information were stored in the IC card 10, even if the memory mounted on the IC card 10 is a read-only ROM. If information is to be actually written into or read from a writable RAM mounted on the IC card 10 through non-contact accesses, it will take longer to make an access to such a RAM, than an access to the control apparatus 30. Thus, in this embodiment, information can be cataloged into and retrieved from the ID database 31 of the control apparatus 30 at a higher speed.

In this embodiment, a keyed MAC and an ID number are stored in the IC card 10 in advance. The keyed MAC is information for authenticating the ID number which can be authenticated by using a key owned by the control apparatus 30. Because the keyed MAC and the key owned by the control apparatus 30 can be used to check whether the ID number stored in the IC card 10 has been altered, information security is improved.

In this embodiment, as information stored in chip 12, the number of attribute numbers A1 to An used may vary from chip to chip. In this case, it is necessary to additionally store class information showing the number of attribute numbers A1 to An used in chip 12, as shown in FIG. 3b. With such class information added, ID numbers can be cataloged in the ID database 31 by associating the ID numbers with a set of attribute numbers and class information as shown in FIG. 7. The ID database 31 is searched for desired information cataloged for the IC card 10 by narrowing the search range into a sub-sub-range defined by particular class information, further narrowing the sub-range into a sub-range defined by a specific set of attribute numbers and finally searching the sub-sub-range for the desired information indicated by a particular ID number.

The embodiment can be altered by providing the portable apparatus 20 with the authentication unit 34 employed in the control apparatus 30, as shown in FIG. 6. In this case, an ID number and a set of attribute numbers read from the IC card 10 are authenticated by the authentication unit 34 in the portable apparatus 20 by using the keyed MAC read from the IC card 10 along with the ID number and the set of attribute numbers. If the ID number and the set of attribute numbers are verified as unaltered, they are transmitted to the control apparatus 30.

Unlike the embodiment described above, there is a case in which an operation to examine information cataloged in the ID database 31 is performed, followed by an operation to catalog information into the ID database 31. In a typical operation to examine information cataloged in the ID database 31, the cataloged information is displayed on the display unit 25 and altered by the user by operating the input unit 24. In this case, the operation to catalog the information into the ID database 31 is performed by the process shown in the flowchart in FIG. 10, but excluding steps S1102 to S1105 and steps S1107 to S1109.

A further embodiment of the present invention is described next. This embodiment is different from the embodiment above in that, when the portable apparatus examines pieces of information cataloged in the ID database containing the same set of attribute numbers stored in chips 12, an access is not made to the control apparatus each time information, such as an ID number and a set of attribute numbers are read from the IC card 10. This allows processing at a higher speed.

In this embodiment, the configuration of the portable apparatus 60 and the control apparatus 70 are different from the configurations of the portable apparatus 20 and the control apparatus 30 employed in the embodiment described above. In addition, the structure of information stored in the ID database 71 is different from the structure of information stored in the ID database 31 used in the embodiment described above.

Figure 11:
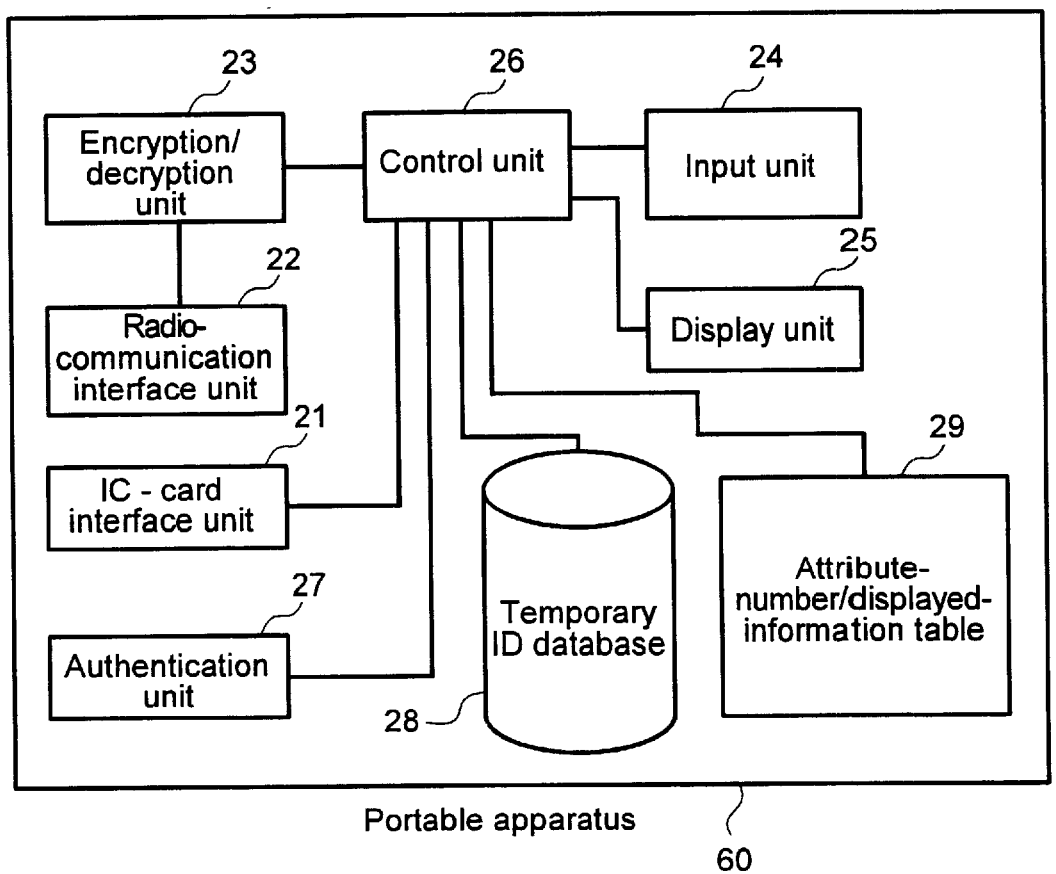
FIG. 11 is a block diagram showing the configuration of a portable apparatus 60 provided by another embodiment of the present invention.

FIG. 11 is a block diagram showing portable apparatus 60 provided by this embodiment. As shown, the portable apparatus 60 is different from apparatus 20 shown in FIG. 4, in that the former is provided with an authentication unit 27, a partial ID database 28 and an attribute-number/displayed-information table 29. The authentication unit 27 has the same function as the authentication unit 34 employed in the control apparatus 30 shown in FIG. 6. The partial ID database 28 is used for temporarily holding a part of data stored in the ID database 31 received from the control apparatus 70.

The attribute-number/displayed-information table 29 includes information pairs, each provided for a set of attribute numbers or a set of IC-card attributes. Each of the pairs includes a set of attribute numbers and information to be displayed for the set of attribute numbers which are assigned to and associated with the information. The content of the attribute-number/displayed-information table 29 is updated by information downloaded from the control apparatus 70 periodically, or in accordance with a command entered by the user.

Figures 12, 13:
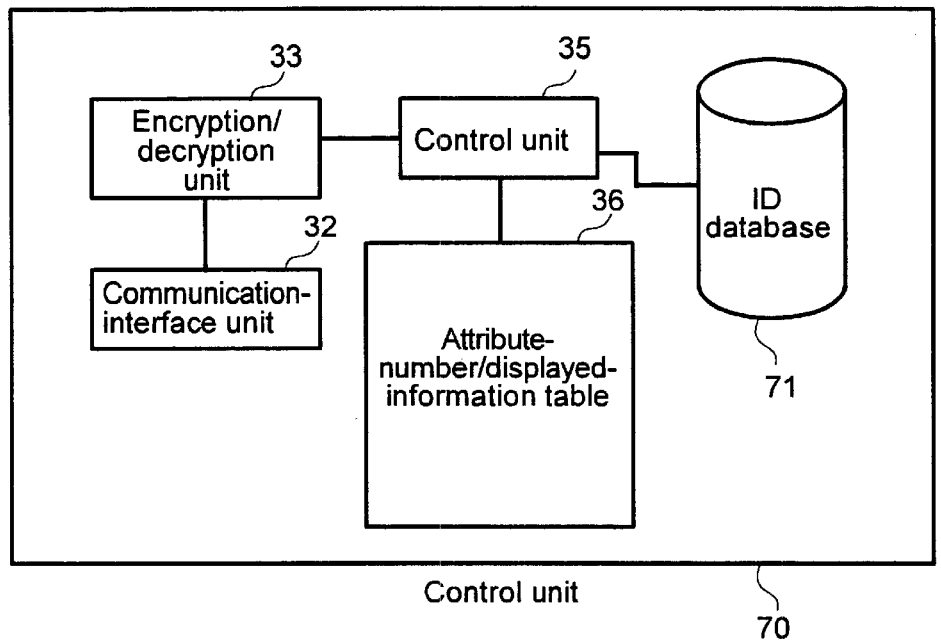
FIG. 12 is a block diagram showing the configuration of a control apparatus 70 provided by another embodiment.
FIG. 13 is an explanatory diagram showing data stored in an ID database 71 of the control apparatus 70.

FIG. 12 is a block diagram showing the configuration of the control apparatus 70. The control apparatus 70 is different from control apparatus 30 shown in FIG. 6 in that the former does not have the authentication unit 34, but is provided with an attribute-number/displayed-information table 36. In addition, the structure of information stored in the ID database 71 used in this embodiment is different from the structure of information stored in the ID database 31 used in the previous embodiment.

Like table 29, the attribute-number/displayed-information table 36 includes information pairs, each provided for a set of attribute numbers A1 to An or a set of IC-card attributes. Each of the pairs includes a set of attribute numbers and information to be displayed for the set of attribute numbers which are assigned to and associated with the information. The contents of the attribute-number/displayed-information table 36 are downloaded to the portable apparatus 60 periodically, or in response to a command received from the portable apparatus 60. In this way, the contents of table 29 are updated with the contents of the attribute-number/displayed-information table 36.

As shown in FIG. 13, the ID database 31 is used for cataloging ID numbers assigned by the provider of chip 12 by associating each of the ID numbers to attribute numbers assigned along with the ID number. An area for identifying the purchaser of an IC card 10 is provided on each row for the ID number and attribute numbers associated with the ID number. If necessary, the user ID number and the information are updated.

Figure 14:
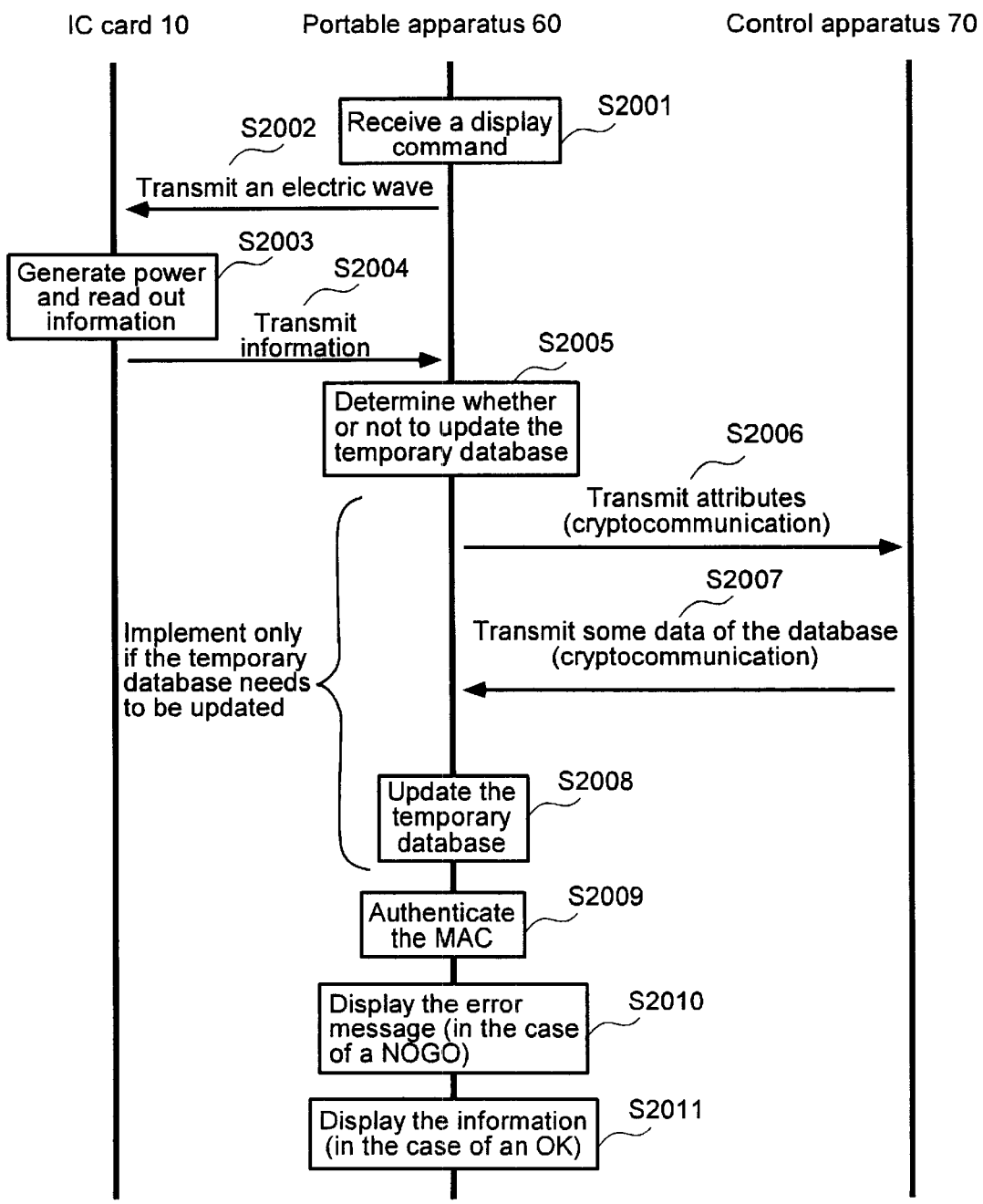
FIG. 14 is a diagram showing a sequence of operations performed by the control to examine information cataloged in the ID database 71.

The operation of the control system is as follows. FIG. 14 is a diagram showing a sequence of operations carried out by the control system to examine information cataloged in the ID database 71, and to perform processing using the information from commands entered by the user of the portable apparatus 60. Much like the sequence of operations shown in FIG. 9, the processing using the cataloged information is exemplified by an operation to acquire transmitted information and display the information. The sequence of operations starts when the user of apparatus 60 places it in a position in close proximity to the IC card 10 and enters a command to display information cataloged for the IC card 10.

Processing carried out at steps S2001 to S2004 are the same as the steps S1001 to S1005 of the sequence of operations shown in FIG. 9. At step S2005, the control unit 26 decides whether to update the contents of the partial ID database 28 on the basis of information received from the IC card 10 through the IC-card interface unit 21. If a set of attribute numbers received from the IC card 10 are included in the contents of the partial ID database 28, it is not necessary to update the contents of the partial ID database 28. If a set of attribute numbers received from the IC card 10 are not included in the contents of the partial ID database 28, or if no information is stored in the partial ID database 28, it is necessary to update the contents of the partial ID database 28.

If it is necessary to update the contents of the partial ID database 28, the control unit 26 delivers the set of attribute numbers to the encryption/decryption unit 23. That unit encrypts them before transmitting them to the control apparatus 70 using the radio-communication interface unit 22 at step S2006.

In the control apparatus 70, the encryption/decryption unit 33 decrypts the encrypted information received from the portable apparatus 60. Attribute numbers obtained from the decryption are delivered to the control unit 35. The control unit 35 searches the ID database 71 for an ID number of a row for cataloging the set of attribute numbers received from the encryption/decryption unit 33, a user ID number and information cataloged on the row. FIG. 13 shows data stored in the ID database 71. The ID number of a row, the user ID number and the cataloged information are supplied to the encryption/decryption unit 33 which then encrypts them prior to transmission to the portable apparatus 60 using the communication interface unit 32 at step S2007.

In the portable apparatus 60, the encryption/decryption unit 23 decrypts the encrypted information received. Information obtained from the decryption is delivered to the control unit 26 which updates the partial ID database. 28 by cataloging the information therein and associating the information with the set of attribute numbers received from the IC card 10 at step S2008. Then, the set of attribute numbers and the keyed MAC received from the IC card 10 are supplied to the authentication unit 27 for authentication at step S2009. If step S2005 indicates that it is not necessary to update the contents of the partial ID database 28, the sequence of operations goes on from the step S2005 directly to the step S2009.

At step S2009 the authentication unit 27 decides whether the ID number and/or the set of attribute numbers have been altered on the basis of the keyed MAC. If the result is NG indicating that the ID number and/or the set of attribute numbers have been altered, the sequence of operations goes to step S2010, and an error message is displayed on display 25. In contrast, if the result is an OK indicating that the ID number and the set of attribute numbers have not been altered, the sequence of operations goes to step S2011. The control unit 26 then searches the partial ID database 28 for an ID number matching with the ID number received from the IC card 10, reading the user ID number and cataloged information associated with the ID number from the partial ID database 28. In addition, the control unit 26 searches the attribute-number/displayed-information table 29 for information to be displayed for the set of attribute numbers received from the IC card 10. Then, the user ID number, the cataloged information and the information for display obtained from the attribute-number/displayed information table 29 are displayed on the display unit 25.

Figure 15:
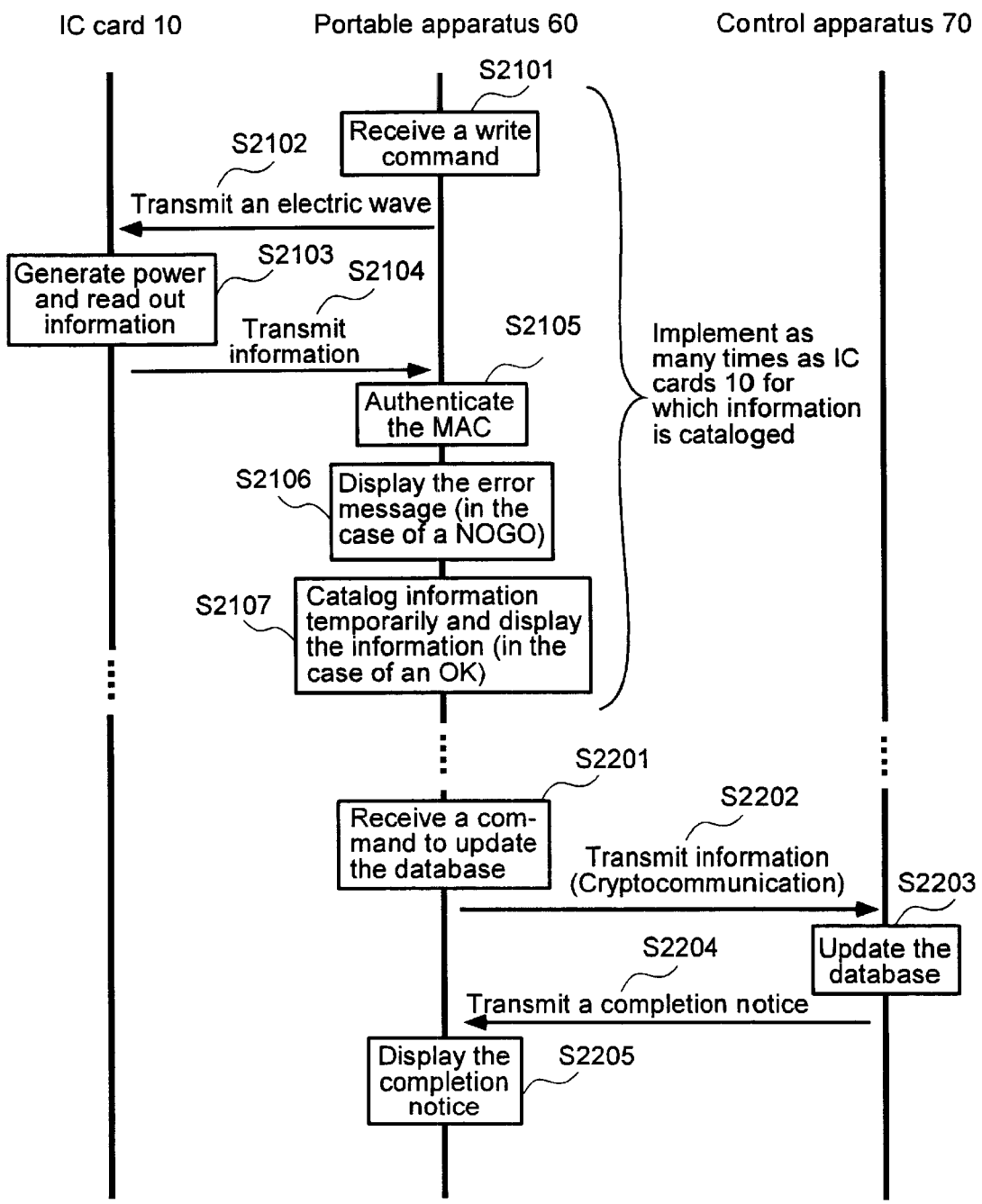
FIG. 15 is a diagram showing a sequence of operations performed by the user of the portable apparatus 60 to write information to be cataloged in the ID database 71 of the control apparatus 70 for the IC card 10.

FIG. 15 is a diagram showing a sequence of operations performed by the user of apparatus 60 to write information to be cataloged in the ID database 71. The operations are explained by referring to FIG. 15 as follows. The sequence of operations starts when the user moves apparatus 60 to a position in close proximity to the IC card 10 and enters a command to catalog a user ID number or information for the IC card 10 to the input unit 24 of the portable apparatus 60.

The processing carried out at steps S2101 to S2104 are the same as the steps S1101 to S1105 of the sequence of operations shown in FIG. 10. At step S2105, an ID number, a set of attribute numbers and a keyed MAC received from the IC card 10 are supplied by the control unit 26 employed in the portable apparatus 60 to the authentication unit 27 for authentication. The authentication unit 27 determines if the ID number and/or the set of attribute numbers have been altered on the basis of the keyed MAC.

If the result is a NG indicating that the ID number and/or the set of attribute numbers have been altered, the sequence of operations goes on to step S2106 at which the control unit 26 employed in the portable apparatus 60 displays an error message on the display unit 25. If the result of the judgment is an OK indicating that the ID number and the set of attribute numbers have not been altered, the sequence of operations goes on to step S2107. Then the control unit 26 temporarily stores a user ID number or information to be cataloged entered by the user via the input unit 24 in the memory 202 by associating the user ID number or the information with the ID number or the set of attribute numbers received from the IC card 10. A message notifying the user of the operation to temporarily store the user ID number or the information is displayed on the display unit 25.

The processing of steps S2101 to S2107 are repeated as many times as the portable apparatus 60 is positioned in proximity to the IC card 10 and a command is entered to catalog a user ID number or information for the IC card. As a result, in the memory 202, the number of combinations, each comprising a temporarily cataloged user ID number or temporarily cataloged information, an ID number and a set of attribute numbers increases. If the user of the portable apparatus 60 enters a command to update the ID database 71, the processing described below is performed to catalog the combinations, each comprising a temporarily cataloged user ID number or temporarily cataloged information, an ID number and a set of attribute numbers into the ID database 71.

When the control unit 26 of the portable apparatus 60 receives a command to update the ID database 71 entered by the user at step S2201, the control unit 26 reads all the combinations, each comprising a temporarily cataloged user ID number or temporarily cataloged information, an ID number and a set of attribute numbers from the memory 202, supplying the combinations to the encryption/decryption unit 23. If there is a combination including a set of attribute numbers matching with those stored in the partial ID database 28, data stored in a row in the partial ID database 28 indicated by matching with the set of attribute numbers is updated with the data to reflect the combination in the partial ID database 28. The encryption/decryption unit 23 encrypts the information included in the combinations by using a common key kept secret between the portable apparatus 60 and the control apparatus 70, or by using a public key forming a pair in conjunction with a private key kept confidential by the control apparatus 70. At step S2202, the encryption/decryption unit 23 transmits the encrypted information to the control apparatus 70 using the radio-communication interface unit 22.

In the control apparatus 70, the encryption/decryption unit 33 decrypts the encrypted information received through the communication interface unit 32. Combinations, each composed of a user ID number or information to be cataloged, an ID number and a set of attribute numbers obtained as a result of the decryption are all supplied to the control unit 35. The control unit 35 searches the database 71 for rows, each matching with an ID number and a set of attribute numbers included in any of the combinations received from the encryption/decryption unit 33, updates the user ID number or the information to be cataloged in each of the rows with the user ID number or the information included in the combination with an ID number and a set of attribute numbers matching with those of the row at step S2203. As a result, the contents of the combinations temporarily stored in the memory 202 are reflected in the updated ID database 71.

When the operation to update the database 71 is completed, the control unit 35 of the control apparatus 70 transmits a completion notice to the portable apparatus 60 using the encryption/decryption unit 33 and the communication interface unit 32 at step S2204. The control unit 26 displays the completion notice received through the radio-communication interface unit 22 and the encryption/decryption unit 23 on the display unit 25 at step S2205.

According to this embodiment, when the user of the portable apparatus 60 examines pieces of information stored in the database 71 of the control apparatus 70 for a plurality of IC cards 10 consecutively with the IC cards 10 containing the same set of attribute numbers, it is not necessary to access the control apparatus 70 each time an ID number is read from one of the IC cards 10. In this way, it is possible to carry out the processing to search database 71 in a shorter period of time.

By the same token, when the user stores pieces of information in the ID database 71 consecutively with the IC cards 10 containing the same set of attribute numbers, it is not necessary to access the control apparatus 70 each time an ID number is read from one of the IC cards 10. In this way, it is possible to carry out the processing to catalog ID database 71 in a shorter period of time. Furthermore, according to this embodiment, an IC card 10 can be controlled by using user ID numbers as an original control number without it being aware of ID numbers.

Moreover, in this embodiment, the attribute-number/displayed-information table 29 allows cataloging information or a user ID number for an IC card 10 to be displayed on the portable apparatus 60 along with attributes represented by attribute numbers read from the IC card 10. As a result, IC cards 10 can be efficiently controlled. The partial ID database 28 also can be provided in another computer which is locally connected to the portable apparatus 60.

In another embodiment as described above, there is a case in which an operation to examine information cataloged in the ID database 71 of the control apparatus 70 for the IC card 10 is carried out by the user of the portable apparatus 60 followed by an operation to catalog information into the ID database 71. In a typical operation to examine information cataloged in the ID database 71, the information displayed on the display unit 25 is modified by the user by operating the input unit 24. In this case, the operation to catalog the information into the ID database 71 is carried out by executing the processing represented by the flowchart shown in FIG. 15, but excluding steps S2102 to S2106 in accordance with a command to catalog the information entered by the user. After information to be cataloged for a plurality of IC cards 10 or user ID numbers for the IC cards 10 are temporarily stored in the memory 202 by executing processing of steps S2001 to S2011 in the flowchart shown in FIG. 14, and the steps S2101 through S2107 in the flowchart shown in FIG. 15, the processing of the steps S2201 to S2205 of the flowchart shown in FIG. 15 is carried out to reflect the cataloged information or the user ID temporarily stored in the memory 202.

It should be noted that the encryption/decryption unit 23 of the portable apparatus 20 or 60 and the encryption/decryption unit 33 of the control apparatus 30 or 70 can also be implemented by LSI chips in place of programs executed by the CPUs. In addition, the processing using cataloged information is not limited to an operation to display the information on a display unit as described earlier. For example, the processing also can be an operation to notify the user by sound. In this case, the portable apparatus is provided with an audio output means in place of a display means.

Some of the applications of the embodiments of the present invention described above are:

(1) Application to Personal Identification Cards

By additionally recording information such as the birthday and a picture of the user of an IC card 10 as information to be cataloged for the IC card 10, the card can be used as a personal identification card. By further including a time limit for validity of the information, the IC card 10 can be used as a card that needs to be renewed such as a driver license.

(2) Application to Gift Voucher

By additionally recording information as to whether the IC card 10 is usable or not, and a period of validity of the IC card 10 as information to be cataloged for the IC card 10, the IC card 10 can be used as a gift voucher to be used only once or which is valid only for a predetermined period. An example of a gift voucher that can be used only once is a book voucher. History information such as time and date as well as a place at which the IC card 10 is used can also be cataloged. History information, including the same date and the same time, but different places of use of the card 10 may be used to indicate that the IC card has been illegally copied.

(3) Application to Commodity Tags

By additionally recording the name and the type of a commodity, or information on people involved in the manufacturing of the commodity, such as the manufacturer or the distributor as information to be cataloged for the IC card 10 and attaching the IC card 10 to the commodity, the IC card 10 can be used as a tag. The user of the portable apparatus, if a seller of commodities, for example, can use the tag for stock and inventory control. On the other hand, if the user is a buyer, the tag can be used to describe detailed information on the commodity. As in other applications, a description of an article displayed in an exhibition can be given by use of such tags.

(4) Application to Bar Codes

By recording a bar code in chip 12 and appending it to an item or package and by using data related to the code as information to be cataloged for the IC card 10 of the chip 12, the IC card 10 can be used as a bar code. Where the portable apparatus is connected to the control apparatus by a dedicated network, and thus communication security is secured, encrypted communication may not be necessary.

A plurality of control apparatuses can also be provided. In this case, one of the control apparatuses is typically connected to the portable apparatus by a dedicated network. The portable apparatus is not required to have a radio communication function; other communication functions will work.

As an apparatus to fetch information from an IC card 10 and transmit the information to a control apparatus, a desk-top electronic computer can also be used. A keyed MAC stored in chip 12 can be generated, in addition to an ID number and a set of attribute numbers stored in chip 12, by encrypting predetermined information unique to the IC card 10 or a hash value of this information, which includes where to position the chip 12 on the IC card 10 and the size of the chip 12 or the card 10. In this case, the keyed MAC is authenticated in the portable apparatus as follows.

First, the keyed MAC is read from the chip 12 along with the ID number and the set of attribute numbers. It is then decrypted. Data obtained as a result of the decryption is examined to check if the data includes data that matches the ID number and the set of attribute numbers read from chip 12 or their hash values to determine whether the ID number and/or the set of attribute numbers have been altered.

Next, predetermined information unique to the IC card 10 is measured. As described above, the information includes where to position the chip 12 on the IC card 10 and the size of the electronic circuit chip 12 or the IC card 10. Results of the measurement are checked to see if the matching with data are included in the data obtained as a result of the decryption.

Assume that the information stored in the electronic circuit chip 12 mounted on the IC card 10 is copied as is to another electronic circuit chip 12. In this case, the step above will detect an illegal copy from the fact that the results of the measurement are not included in the data obtained as a result of the decryption. This results from a difference in mounting position on the IC card 10 between chips 12 and a difference in size between the chips 12 or the cards 10, even if the differences are small.

Of course, information unique to the IC card 10 can be measured. The portable apparatus can be provided with a camera for taking a photograph of the IC card 10 at a predetermined distance and magnification to produce a picture of the IC card 10. The picture can then be used as a basis for the measurement.

In the embodiments described above, a keyed MAC stored in chip 12 makes possible the use of encrypted data using a common key kept confidential by the user of the electronic circuit chip 12 between the portable and control apparatuses. In this case, the common key is used for determining if an ID number and/or a set of attribute numbers associated with the keyed MAC has been altered. The key for generating a keyed MAC may vary from each one of attribute numbers.

If a plurality of electronic circuit chips 12 storing the same information are mounted on an IC card 10, the information can be read from the IC card 10, even if any one of the chips 12 are damaged. Thus, the life of the IC card 10 is prolonged.

In this case, the IC-card interface unit 21 employed in the portable apparatus generates an electromagnetic wave to fetch information from each of the electronic circuit chips 12 mounted on IC card 10. The number of electronic circuit chips 12 not responding to the electromagnetic wave (not transmitting information) is also counted. If the number of such chips 12 exceeds a predetermined value, the portable apparatus displays a message on the display unit 25, notifying the user that it is time to replace the IC card 10. If a plurality of chips 12 respond to the electromagnetic waves, the IC card interface unit 21 selects one of the responses received from chips 12, supplying the selected one to the control unit 36.

The embodiments described above can be configured so that only the user of the portable apparatus having a predetermined authority is allowed to catalog information for the IC card 10 through the portable apparatus. In such a configuration, typically, information to be cataloged for the IC card 10, and a command to catalog such information, are accepted only when the user enters a predetermined password or inserts a predetermined key.

The present invention can be widely used in applications where the electronic circuit chip 12 is attached directly to a commodity or the package of the commodity. In addition, it appears to the user as if it were possible to store information with an amount exceeding the capacity of a storage medium such as an IC card with an electronic circuit chip mounted thereon or a magnetic recording card into the storage medium, or to store information into a read-only storage medium.

While the present invention has been described in detail and pictorially in the accompanying drawings, it is not limited to such details since many changes and modifications recognizable to those of ordinary skill in the art may be made to the invention without departing from the true spirit and the scope thereof.

The preceding has been a description of the preferred embodiment of the invention. It will be appreciated that deviations and modifications can be made without departing from the scope of the invention, which is defined by the appended claims.

What is claimed is:

1. A control method for storing and/or retrieving information in association with ID information of a storage medium in a system having a control apparatus and a terminal coupled to the storage medium:

in an operation of storing the information to be stored;

the terminal accepts input of the information to be stored;

reads out the ID information from the storage medium;

transmits the inputted information to be stored and the ID information to the control apparatus;

the control apparatus stores the information to be stored therein in association with the ID information;

in an operation of retrieving information already stored, the terminal reads out the ID information from the storage medium and transmits the ID information to the control apparatus;

the control apparatus retrieves the information already stored therein based on the ID information; and transmits the retrieved information to the terminal; and the terminal receives the retrieved information.

2. The control method according to claim 1, wherein:

the storage medium further stores authentication information in advance for authenticating the ID information by using a key owned by the control apparatus;

in the operation of storing the information further reads out the authentication information from the storage medium and transmits the authentication information to the control apparatus;

the control apparatus checks the ID information on the basis of the authentication information by using the key, wherein when the validity of the ID information is checked, the information is stored therein in association with the ID information, in the operation of retrieving information already stored, the terminal further reads out the authentication information from the storage medium and transmits the authentication information to the control apparatus;

the control apparatus checks the ID information on the basis of the authentication information by using the key; and when the validity of the ID information is checked, the information already stored therein is retrieved based on the ID information.

3. The control method according to claim 1, wherein the storage medium further stores attribute information along with the ID information in advance;

wherein the control apparatus stores pieces of ID information of the storage medium and pieces of information in association with the attribute information stored in the storage medium;

wherein the terminal stores some of the pieces of ID information and some of the pieces of stored information that are stored in the control apparatus and are associated with at least one attribute information;

wherein the terminal reads out ID information and attribute information from the storage medium, checks whether or not the ID information that has been read out and is associated with the attribute information read out is included in the some of the pieces of the ID information, if the terminal does not store the ID information that has been read out, the terminal executes the steps of:

acquiring ID information and stored information associated with the attribute information from the control apparatus;

using the ID information and the stored information acquired from the control apparatus to update the some of the pieces of ID information and the some of the pieces of stored information;

displaying the acquired stored information associated with the acquired ID information;

if the terminal stores the ID information that has been read out, the terminal executes the steps of:

searching the some of the pieces of ID information based on the ID information read out from the storage medium; and displaying the stored information associated with searched the ID information.

4. The control method according to claim 1, wherein: the information to be stored may include user ID number of the storage medium.

5. The control method according to claim 1, wherein the terminal displays the retrieved information.

6. A control system for storing and/or retrieving information in association with ID information of a storage medium stored therein comprising: a terminal and a control apparatus, where the control apparatus comprises:
   a data base for storing the information to be stored in association with the ID information;
   means for storing, in an operation of storing, the information to be stored received from the terminal in the data base by associating with the ID information;
   means for retrieving, in an operation of retrieving, stored information from the data base based on the ID information received from the terminal;
   means for transmitting, in the operation of retrieving, the retrieved information to the terminal;

wherein the terminal comprises:
   means for reading out ID information from the storage medium;
   means for transmitting, in the operation of storing, the ID information to the control apparatus;
   means for receiving, in the operation of retrieving, the retrieved information transmitted from the control apparatus;
   means for accepting, in the operation of storing, information to be stored for the storage medium, and
   wherein the means for transmitting further transmits, in the operation of storing, the information to be stored together with the ID information to the control apparatus.

7. The control system according to claim 6;
wherein the storage medium comprises:
   an electronic circuit chip used for storing the ID information in advance;
      an antenna device used for generating a power by using an electric wave received from the terminal for reading out the ID information from the electronic circuit chip and transmitting the information, and
      wherein the means for reading out of the terminal transmits the electric wave to the storage medium.

8. The control system according to claim 6, wherein the terminal further comprises means for displaying the information received by the receiving means.

9. The control system according to claim 6:
wherein the storage medium further stores authentication information in advance for authenticating the ID information by using a key owned by the control apparatus;
wherein the terminal further reads out the authentication information from the storage medium and transmits the authentication information to the control apparatus;
wherein the means for reading out further reads out the authentication information from the storage medium;
wherein the means for transmitting further transmits the authentication information to the control apparatus;
wherein the control apparatus further comprises means for checking the ID information on the basis of the authentication information by using the key;
wherein the means for storing stores, when the validity of the ID information is checked, the information to be stored therein in association with the ID information; and
wherein the means for retrieving retrieves, when the validity of the ID information is checked, the information already stored therein based on the ID information.

10. The control system according to claim 6;
wherein the storage medium further stores attribute information along with the ID information in advance, the attribute information being used for classifying the storage medium and the ID information being unique to each of the storage medium;
wherein the means for reading out of the terminal further reads out the attribute information from the storage medium;
wherein the database of the control apparatus stores the information to be stored and the ID information in association with the attribute information;
wherein the means for retrieving of the control apparatus retrieves the stored information and the ID information based on the attribute information; and
wherein the means for transmitting of the terminal transmits the attribute information and the ID information.

11. The control system according to claim 6:
wherein the information to be stored may include user ID number of the storage medium.

12. A control system for storing and/or retrieving information in association with ID information of a storage medium and attribute information stored in the storage medium comprising: a terminal and a control apparatus:

wherein the control apparatus comprises:
   a data base for storing the information to be stored in association with the ID information and the attribute information;
   means for retrieving, in an operation of retrieving, the ID information and stored information from the data base based on the attribute information received from the terminal;
   means for transmitting, in the operation of retrieving, the retrieved ID information and the stored information to the terminal,
the terminal comprises:
   a temporary data base for storing some of the pieces of ID information and some of the pieces of stored information both stored in the data base of the control apparatus in association with the attribute information;
   means for reading out the ID information and the attribute information from the storage medium;
   means for searching the temporary data base for the ID information and the stored information based on the attribute information; and
   means for transmitting the attribute information to the control apparatus to retrieve ID information and stored information to update the temporary data base in case the temporary data base neither store the ID information nor stored information in association with the attribute information.

* * * * *